(12) United States Patent
Warfield et al.

(10) Patent No.: US 11,169,889 B1
(45) Date of Patent: Nov. 9, 2021

(54) SYSTEMS, DEVICES AND METHODS FOR DETERMINING AND RECLAIMING SNAPSHOT STORAGE CONSUMPTION IN DATA STORAGE SYSTEMS

(71) Applicants: Andrew Warfield, Vancouver (CA); Jacob Taylor Wires, Vancouver (CA)

(72) Inventors: Andrew Warfield, Vancouver (CA); Jacob Taylor Wires, Vancouver (CA)

(73) Assignee: OPEN INVENTION NETWORK LLC, Durham, NC (US)

( * ) Notice: Subject to any disclaimer, the term of this patent is extended or adjusted under 35 U.S.C. 154(b) by 79 days.

(21) Appl. No.: 15/972,659

(22) Filed: May 7, 2018

Related U.S. Application Data

(60) Provisional application No. 62/502,564, filed on May 5, 2017.

(51) Int. Cl.
*G06F 11/14* (2006.01)

(52) U.S. Cl.
CPC ...... *G06F 11/1458* (2013.01); *G06F 11/1451* (2013.01); *G06F 2201/84* (2013.01)

(58) Field of Classification Search
CPC ............. G06F 11/1458; G06F 11/1451; G06F 2201/84
See application file for complete search history.

(56) References Cited

U.S. PATENT DOCUMENTS

| | | | | |
|---|---|---|---|---|
| 8,032,498 B1 * | 10/2011 | Armangau | ............ | G06F 16/128 707/690 |
| 8,612,382 B1 * | 12/2013 | Patel | ................... | G06F 11/0727 707/609 |
| 8,706,833 B1 * | 4/2014 | Bergant | ............... | G06F 16/1756 709/214 |
| 8,738,570 B2 * | 5/2014 | Picken | .................. | G06F 16/178 707/626 |
| 10,387,369 B1 * | 8/2019 | Davenport | ............ | G06F 3/0652 |
| 2003/0158861 A1 * | 8/2003 | Sawdon | ............. | G06F 11/2097 |
| 2003/0158873 A1 * | 8/2003 | Sawdon | .................. | G06F 16/10 |
| 2003/0159007 A1 * | 8/2003 | Sawdon | ............. | G06F 11/1466 711/154 |
| 2007/0106706 A1 * | 5/2007 | Ahrens | ................. | G06F 16/128 |
| 2014/0095823 A1 * | 4/2014 | Shaikh | .................. | G06F 16/188 711/165 |
| 2016/0274974 A1 * | 9/2016 | Chen | ....................... | G06F 3/067 |
| 2016/0335278 A1 * | 11/2016 | Tabaaloute | ............ | G06F 16/184 |
| 2017/0315878 A1 * | 11/2017 | Purohit | ................... | G06F 3/067 |
| 2018/0267985 A1 * | 9/2018 | Badey | .................. | G06F 16/184 |

* cited by examiner

*Primary Examiner* — Jorge A Casanova

(57) ABSTRACT

Disclosed are methods and systems for of determining snapshot storage space consumption in a data storage system, a snapshot being a representation of a given state of a data object comprising of direct references to data blocks for data that has been changed from a prior state and indirect references to existing direct references in the prior state for unchanged data, the method comprising the steps: for each write of data to a given snapshot of the data object, storing unique address information relating to the unique direct references for said writes, said unique address information comprising at least a count of unique direct references; upon generating a further snapshot of a prior snapshot, retaining said prior snapshot and unique address information in storage as read-only access; and determining a count of unique direct references for all snapshots relating to the data object based on the stored unique address information.

11 Claims, 5 Drawing Sheets

SYSTEMS, DEVICES AND METHODS FOR DETERMINING AND RECLAIMING SNAPSHOT STORAGE CONSUMPTION IN DATA STORAGE SYSTEMS

FIELD OF THE DISCLOSURE

The present disclosure relates to the management of snapshots in data storage systems, and, in particular, to systems, devices and methods for determining and reclaiming snapshot storage consumption in data storage systems.

BACKGROUND

Efficient snapshots are an important feature of modern storage systems. However, the implicit sharing underlying most snapshot implementations makes it difficult to answer basic questions about the storage costs of individual snapshots. Traditional techniques for answering these questions incur significant performance penalties due to expensive metadata overheads.

In computer systems, a snapshot is often referred to a representation of the state of a system at a particular point in time. Snapshot is a common industry term denoting the ability to record the state of a storage device at any given moment and preserve that snapshot as a guide for restoring the storage device in the event that it fails. A snapshot primarily creates a point-in-time copy of the data. Typically, snapshot copy is done instantly and made available for use by other applications such as data protection, data analysis and reporting, and data replication applications. The original copy of the data continues to be available to the applications without interruption, while the snapshot copy is used to perform other functions on the data.

Snapshots provide an excellent means of data protection. The trend towards using snapshot technology comes from the benefits that snapshots deliver in addressing many of the issues that businesses face. Snapshots enable better application availability, faster recovery, easier back up management of large volumes of data, reduces exposure to data loss, virtual elimination of backup windows, and lowers total cost of ownership (TCO), among other benefits.

To avoid downtime, high-availability systems may instead perform the backup on a snapshot—a read-only copy of the data set frozen at a point in time—and allow applications to continue writing to their data. Most snapshot implementations are efficient and can create snapshots in O(1). In other words, the time and I/O needed to create the snapshot does not increase with the size of the data set; by contrast, the time and I/O required for a direct backup is proportional to the size of the data set. In some systems once the initial snapshot is taken of a data set, subsequent snapshots copy the changed data only, and use a system of pointers to reference the initial snapshot. This method of pointer-based snapshots consumes less disk capacity than if the data set was repeatedly cloned. Read-write snapshots are sometimes called branching snapshots, because they implicitly create diverging versions of their data. Aside from backups and data recovery, read-write snapshots are frequently used in virtualization, sandboxing, and virtual hosting setups because of their usefulness in managing changes to large sets of files.

A basic feature of modern storage systems is the ability to quickly and inexpensively create snapshots of objects, files, and volumes. Snapshots facilitate many common administrative tasks and can dramatically improve capacity utilization for many workloads. They provide the foundation for important features like backup, checkpoint and recovery, and desktop management and customization, and they are especially valuable in cloud environments where storage costs are key contributors to both capital and operating expenses. Indeed, while snapshot support is today becoming prevalent in desktop systems, it has long been a standard feature of enterprise products and is likewise offered by most cloud storage services. Copy on write (CoW) techniques enable efficient snapshot implementations by allowing multiple files to safe share read-only blocks, eliminating the need to create redundant copies of common data. CoW systems enforce isolation by ensuring that writes applied to shared blocks are redirected to private copies. This approach has two appealing properties: first, it allows snapshots to be created quickly, and second, it lowers costs by reducing storage consumption. As disclosed herein, snapshots and clones may be referred to interchangeably depending on context, as are images, files, objects, and volumes. These benefits come at the cost of considerable additional complexity when managing storage metadata. In particular, CoW snapshots make it difficult to track block ownership as snapshots age and data is overwritten. Indeed, the implicit sharing that makes it so easy to create new CoW snapshots also makes it challenging to manage them over time. For example, when a snapshot is initially created, it shares all blocks with its base image; however, as blocks in the base image are overwritten, the snapshot subsequently takes exclusive ownership of the original copies, making accurate space accounting difficult.

The creation and deletion of additional snapshots only further obfuscates this accounting. This complexity has important consequences for both storage designers and administrators: tasks such as enforcing user quotas when admitting new writes or predicting how much space a given snapshot is consuming can be costly, as they can require computations over large amounts of metadata. Moreover, the burden of keeping this metadata up to date can be quite high, both in terms of implementation effort and performance penalties.

Approaches for tracking CoW ownership traditionally fall into one of two categories. The first involves explicitly maintaining back references from blocks to the files that own them. This approach requires carefully designed metadata and update procedures to mitigate the cost of maintaining accurate references as new writes are admitted. The second approach defers maintenance costs to a background task that periodically scans file metadata to determine block liveness and reachability. This strategy is generally simpler and requires fewer metadata updates, but the information it provides may frequently be outdated, making it unsuitable for some use cases.

While precise ownership accounting is a requirement for block allocators and garbage collectors, in many scenarios approximate accounting will suffice, so long as it is reasonably up to date. Embodiments hereof may comprise techniques based on probabilistic data structures that provides accurate estimates with very little overhead. Such techniques may produce efficient metadata sketches that are maintained completely separately from the underlying storage system, allowing them to be easily retrofitted into existing systems. Three sketch variants are evaluated herein and it is shown how improved accuracy can be obtained at the cost of additional storage overhead.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

Embodiments hereof may utilize a probabilistic data structure, compatible with existing storage systems, that can provide approximate answers about snapshot costs with very low computational and storage overheads.

A need exists for systems, devices and methods for determining and reclaiming snapshot storage consumption in data storage systems that overcome some of the drawbacks of known techniques, or at least, provides a useful alternative thereto. Some aspects of this disclosure provide examples of such devices and methods.

In accordance with one aspect, there is provided a method of determining snapshot storage space consumption in a data storage system, the data storage system comprising one or more storage resources for storing data and a snapshot being a representation of a given state of a data object comprising of direct references to data blocks for data that has been changed from a prior state and indirect references to existing direct references in the prior state for unchanged data, the method comprising the steps: selecting for a given data object stored in the data storage system, a first snapshot of said data object; identifying at least some prior snapshots from which the first snapshot was directly or indirectly created; determining a count of unique direct references from all of the first and prior snapshots; and storing the count of unique direct references in association with the first snapshot.

In accordance with another aspect, there is provided a method of determining snapshot storage space consumption in a data storage system, the data storage system comprising one or more storage resources for storing data and a snapshot being a representation of a given state of a data object comprising of direct references to data blocks for data that has been changed from a prior state and indirect references to existing direct references in the prior state for unchanged data, the method comprising the steps: for each write of data to a given snapshot of the data object, storing unique address information relating to the unique direct references for said writes, said unique address information comprising at least a count of unique direct references; upon generating a further snapshot of a prior snapshot, retaining said prior snapshot and unique address information in storage as read-only access; determining a count of unique direct references for all snapshots relating to the data object based on the stored unique address information.

In accordance with another aspect, there is provided a A data storage system with snapshot storage space consumption management, said data storage system comprising: one or more storage resources for storing data and snapshots thereof, each snapshot being a representation of a given state of a data object comprising of direct references to data blocks for data that has been changed from a prior state and indirect references to existing direct references in the prior state for unchanged data; and a processing component configured to: store unique address information relating to the unique direct references for said writes, said unique address information comprising at least a count of unique direct references and to retain said prior snapshot and unique address information in storage as read-only access upon the creation of new snapshots; and determine a count of unique direct references for all snapshots relating to the data object based on the stored unique address information.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Snapshots are used to create a representation of a data storage system, or parts thereof, at a particular point in time. They may be useful in restoring data that may have been inadvertently lost, changed, or deleted. They can also be useful in determining whether, when, and how often data changes are implemented. While there are significant space saving benefits of a snapshot, they will nevertheless occupy space depending on factors that include but are not limited to the frequency of writes to a data object, the frequency of snapshots created, the length of time that a snapshot is retained, replication of snapshots and/or data objects, and the fragmentation of data object snapshots. Period deletion of snapshots may become necessary to maintain space in data storage. Moreover, determining the how and when snapshots are increasing in actual size permits data storage system administrators improved management control allowing them to assess when snapshots should be generated, as well as the frequency of creation, how long they should be kept, and the space reclamation benefit from deleting old snapshots. Currently, snapshots are simply deleted once they reach a certain age with no indication of the actual benefit of deleting specific snapshots prior to deletion. The instantly disclosed subject matter provides a systems and devices for such management. In some embodiments, the methods and systems provide for determining the storage usage of some or all snapshots, which snapshots will give the best reclamation of storage usage, as well as important data storage metrics, such as the ratio of actual space to logical space for one or more data objects, the data storage system overall or portions thereof, or any of the one or more snapshots.

Figure 7:
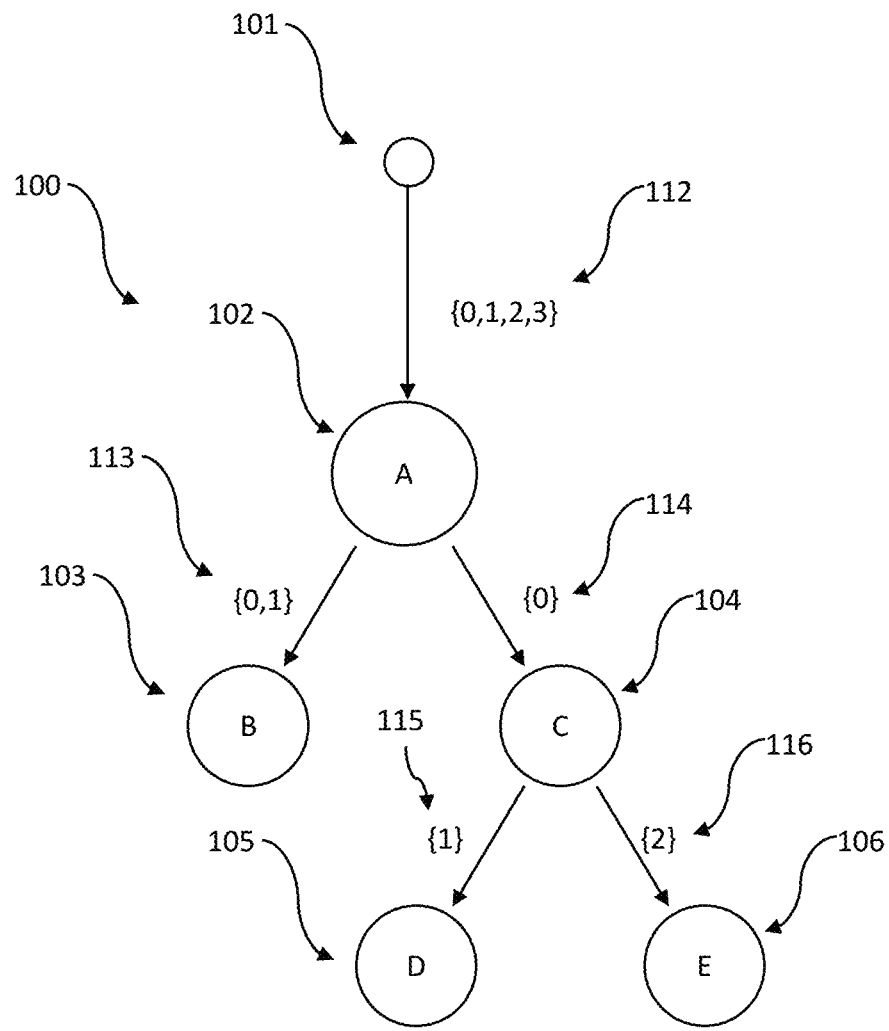
FIG. 7 is a conceptual representation of a number snapshots in different states.

Referring to FIG. 7, there is shown a representation 100 of a number of snapshots of a data object. Prior to saving any data in respect of the data object, the data object can be conceptualized as a null data object 101. Once data is written to the data object, it comprises data at blocks 0, 1, 2 and 3 as shown by the data set 112. Some or all of the data at each of blocks 0, 1, 2 and 3 may or may not be null data. Snapshot A 102 is generated as a snapshot of the data object at tA, which comprises a copy of the data check this with blocks 0, 1, 2, and 3. Subsequent snapshots comprise the new data that is to be written to the data object as well as references to the unchanged data blocks of the prior snapshot, which in the case of the first snapshot or group of snapshot(s) of Snapshot A 102. In FIG. 7, Snapshot B 103 has new data written to blocks 0 and 1, as shown in data set 113. As an additional branch of the snapshot tree 100, another Snapshot C 104, which is a snapshot taken that was based on Snapshot A 102, and which was created upon a write to data block 0, as shown in data set 114. Additional snapshots D 105 and E 106, are generated independently from Snapshot C 104. Snapshot D 105 comprises a copy of new data written to block 1 115 and references to blocks 0, 2, and 3 from Snapshot C 104. Snapshot E 106 comprises a copy of new data written to block 2 116 and references to blocks 0, 1, and 3 from Snapshot C 104. Notably, internal nodes (e.g. Snapshots A and D) are read-only and cannot be deleted unless all nodes below are also deleted, unless all the references are resolved to the highest snapshot.

Accordingly, there are a number of snapshots that can be used to determine that state of the data object at numerous times. The snapshots may respectively comprise different sizes of actual data, and to the extent the data object is changing size, different sizes of logical data. Determining the size of a snapshot is accomplished by determining the number unique blocks to each snapshot. For example, Snapshot E 106 from FIG. 7 comprises a single block with data, that is block 2. The rest is limited to references to corresponding data from Snapshot C 104.

In accordance with one aspect, there is provided a method of determining snapshot storage space consumption in a data storage system, the data storage system comprising one or more storage resources for storing data and a snapshot being a representation of a given state of a data object comprising of direct references to data blocks for data that has been changed from a prior state and indirect references to existing direct references in the prior state for unchanged data, the method comprising the steps: selecting for a given data object stored in the data storage system, a first snapshot of said data object; identifying at least some prior snapshots from which the first snapshot was directly or indirectly created; determining a count of unique direct references from all of the first and prior snapshots; and storing the count of unique direct references in association with the first snapshot.

In accordance with another aspect, there is provided a method of determining snapshot storage space consumption in a data storage system, the data storage system comprising one or more storage resources for storing data. In some embodiments, a snapshot is a representation of a given state of a data object comprising of direct references to data blocks for data that has been changed from a prior state and indirect references to existing direct references in the prior state for unchanged data. In embodiments, the method may comprise the following steps. First, for each write of data to a given snapshot of the data object, unique address information relating to the unique direct references for writes to an existing snapshot is stored. This unique address information may comprise in some embodiments a listing of or a complete set of references to the unique and even non-unique addresses. In some embodiments, it may include a count of unique direct references. In other embodiments, this information is a sketch, which is a representative data set capable of approximating certain characteristics of a much larger set of data, including cardinality or uniqueness. Upon generating a further snapshot of a prior snapshot, embodiments hereof will retain the prior snapshot, and the unique address information in storage as read-only; in general, such prior snapshots are depended on by later snapshots and therefore must be retained. The unique address information is retained in some cases to facilitate a rapid determination of the number of unique blocks in a set of snapshots without analyzing and comparing all the snapshots in a given family of snapshots relating to a data object. In embodiments, a count of unique direct references for all snapshots relating to the data object is determined based on the stored unique address information.

In accordance with another aspect, there is provided a data storage system with snapshot storage space consumption management, said data storage system. In embodiments, the system may comprise one or more storage resources for storing data and snapshots thereof; as well as a processing component configured to store unique address information relating to the unique direct references for said writes, said unique address information comprising at least a count of unique direct references and to retain said prior snapshot and unique address information in storage as read-only access upon the creation of new snapshots; and determine a count of unique direct references for all snapshots relating to the data object based on the stored unique address information.

Modern systems support efficient snapshots as a first-class feature by employing a copy on write strategy wherein shared data is copied just before it is modified. This allows multiple images to share common data for reading and defers the performance and capacity costs of copying data to the point in time when copies are modified.

The fundamental problem that must be solved in order to achieve this is one of address translation: resolving offsets within an image to the physical locations of the corresponding data, and updating these locations when shared data is modified. Most snapshot designs prevalent today can be considered variants of one of two techniques. The first is commonly referred to as linked cloning, while the second can be described as hierarchical addressing.

Figure 2:
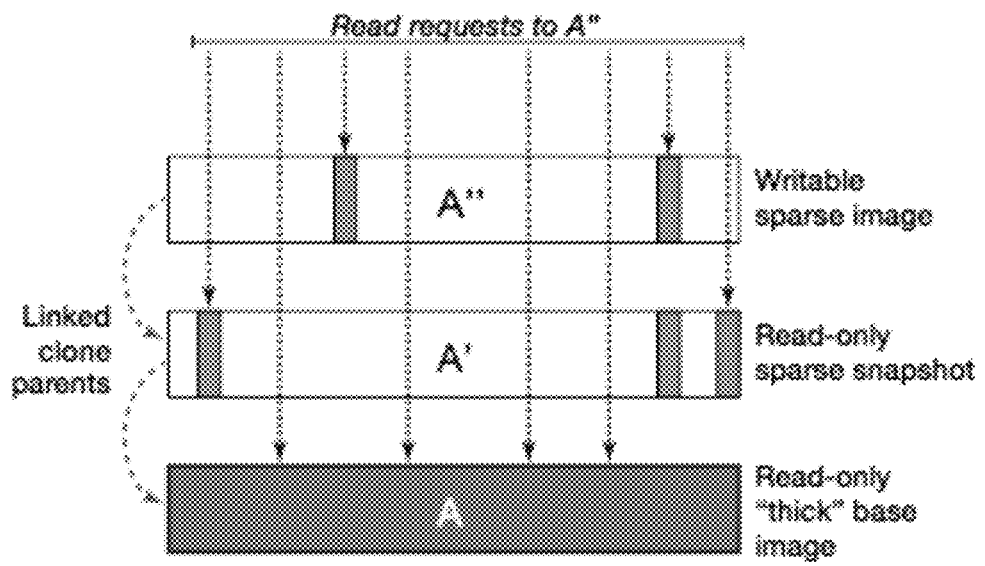
FIG. 2 shows a representation of related snapshots over time in accordance with an embodiment hereof.

Referring to FIG. 2, there is shown an exemplary illustration of a copy on write via overlay addressing in accordance with one embodiment. Writes are applied directly to the top writable image (A''). Reads are forwarded from one image to the next until the requested data is located. With linked cloning, an image is snapshotted by marking it read-only and creating a new image that is linked to it. As FIG. 2 shows, the new image is initially empty, sharing all data with its base. Sharing is broken when new writes are applied to the linked image. Special metadata, typically stored in or alongside the image, records which addresses in the image have been overwritten; this metadata usually takes the form of bitmaps or nested lookup tables, although alternative forms like undo logs also exist. Reads are directed to the linked image if the metadata indicates the requested address has been overwritten; otherwise, the read is forwarded to the base image, where this process repeats.

Both read-only snapshots and writable images can snapshotted by creating new, empty linked images. In this manner, a snapshot family can be seen as a directed acyclic graph (more specifically, a tree) with images as nodes and links as edges. Trees can scale to arbitrary breadth and depth as snapshots are created, although naive implementations exhibit high read latencies for large tree depths.

Figure 3:
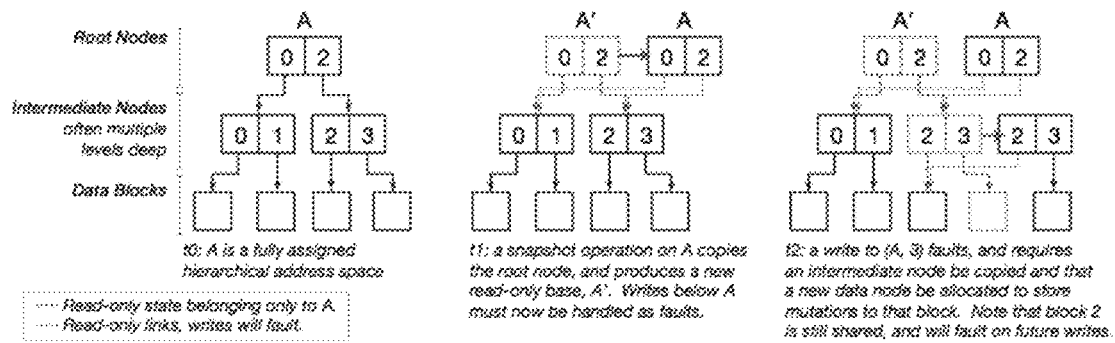
FIG. 3 shows a time-based representation of a tree showing virtual offsets in an image with physical locations of the corresponding data in accordance with an embodiment hereof.

Hierarchical addressing solves the problem of poor read performance for long snapshot chains by maintaining explicit translation maps for snapshots and all derived images. This map is typically structured as a tree (commonly a radix tree or b-tree variant) associating virtual offsets in an image with the physical locations of the corresponding data, as depicted in FIG. 3.

An image is snapshotted by marking the tree and its referents read-only and creating a new writable copy of the tree's root. When shared data is to be overwritten, a new unit of storage is allocated for the incoming data, and the writable image's tree is updated to remap the virtual address to this new location. Updates to shared internal nodes in the tree must also be redirected to new storage locations, and this process may potentially bubble all the way to the root node. This approach may incur more overhead than the linked clone technique when shared data is overwritten, but it ensures a constant overhead on the read path and thus generally scales better for deep snapshot trees.

As a matter of efficiency, copy on write techniques rely on implicit sharing: shared data need not be explicitly linked to all the images that reference it. While this reduces the cost of creating new snapshots and overwriting shared data, it introduces new difficulties in tracking ownership over time. In particular, it is not trivial to determine which data is unique to a given snapshot and which data is shared by other images. This has consequences when the need arises to calculate the space consumed by a given image or snapshot, as when enforcing quotas or managing back-ups. There are two common approaches to solving this problem: the first involves periodically scanning meta-data to compute the reachability of physical data, while the second involves maintaining reference counts to track this information explicitly.

In their simplest forms, both linked cloning and hierarchical addressing maintain only forward references: address translation metadata makes it easy to map an offset within an image to its corresponding data, but no reverse mapping is maintained. This is similar to traditional file systems like ffs and ext4 that do not provide native support for snapshots and can thus safely assume that physical blocks are not shared across files.

In order to determine whether a given disk address is live (i.e., referenced by one or more image) in these systems, it is necessary to scan the metadata of all images in the system. This is generally done using some variant of a mark and sweep algorithm, which builds up an in-memory description of which data can be reached from live images; any data that cannot be reached from any live images may be assumed to be unused and eligible for reclamation. Scanning all image metadata is an expensive task, and as such this algorithm typically only runs in the background during idle periods or when disks are nearly full.

The classical mark and sweep algorithm does not determine how much storage an individual snapshot or image consumes. To answer this question, the algorithm must be modified slightly to consider only disk addresses referenced by a single snapshot family, and to look for addresses only referenced by the snapshot in question.

Techniques like mark and sweep that compute reachability asynchronously are convenient because they do not require additional persistent metadata. However, due to the high cost of executing these approaches, they are not generally well-suited for providing accurate, up to date information about snapshot space usage, especially as this can change rapidly as new writes are admitted into the system.

The alternative to computing reachability asynchronously is to maintain this information synchronously on the data path. The simplest way to do this is to maintain reference counts for all addressable data. When new clones are created, the reference counts of shared data must be incremented. When shared data is modified, the reference counts of the original data are decremented and new disk locations are allocated with a reference count of one.

With this additional metadata, it is fairly easy to compute how much space a given snapshot or image is consuming: simply scan all the forward references of a given snapshot; any data with a reference count of one is exclusive to the snapshot. While easy to implement, this may still be a costly procedure for large images with many allocated blocks.

Maintaining persistent reference counts naively would incur significant performance penalties due to write amplification, so systems which employ this strategy must carefully optimize both their metadata layout and update procedures to mitigate this cost.

These optimizations essentially defer some of the cost of maintaining explicit references until such time as they are actually needed. This somewhat amortizes the performance penalties of reference counting, but it can also lead to stale metadata and/or costly queries. Thus while explicit references make it easier to answer questions about snapshot space consumption than do asynchronous reachability algorithms, they incur heavier costs on the data path and may incur non-trivial query costs once they have been optimized.

Disclosed hereinbelow are illustrative embodiments showing model snapshot families as trees in which lead nodes represent user-visible images or snapshots and internal nodes represent points in time at which snapshots were taken. Leaf nodes can be cloned or snapshotted by linking new empty children to them. Writes are only applied to leaf nodes; snapshotting a leaf node converts it to an internal, read-only node (thus, for the common operation of creating a read-only backup of a writeable leaf image, two new leaf nodes are created: the first represents the backup, while the second takes the place of the original image).

Conventional approaches to ownership accounting are based on analyses of physical block references. Embodiments hereof provide approaches based on an analysis of logical block addresses. This approach has two appealing properties: first, it decouples ownership accounting from underlying snapshot implementations, and second, it admits of a tidy formulation of the problem in set-algebraic terms.

Figure 1:
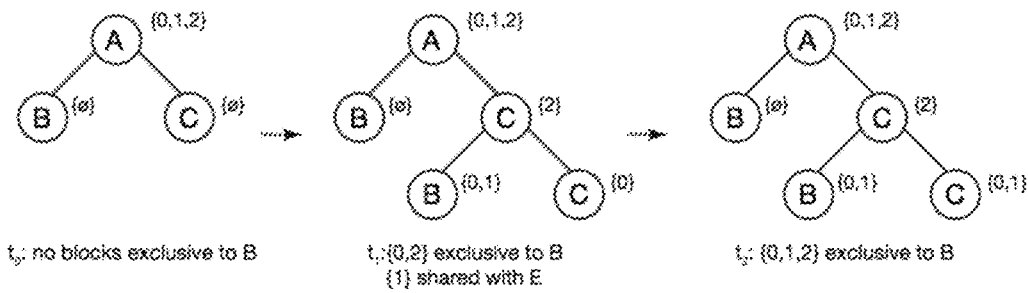
FIG. 1 is a conceptual representation of the implicit sharing of snapshots over time in accordance with an embodiment hereof.

As an example of one implementation context of the instantly disclosed subject matter, consider the challenges faced by a mark and sweep garbage collector attempting to reclaim blocks from a large chain of overlay snapshots. Referring to the snapshot family shown in FIG. 1, assume the logical block 0 in node A is mapped to the physical block b. Before a garbage collector can recycle a block b, it must ensure that no snapshots have the block mapped into their address spaces. One way to do this would be to follow all mappings for every snapshot down to their corresponding physical addresses in order to confirm that there are no references to b.

Another approach, however, would be to observe that the implicit sharing of CoW snapshots guarantees that b will be mapped to the same logical address a in all images that reference it. Consequently, any images that have written to logical address a no longer reference the original block b, but instead reference their own private copies. Further, any image inheriting from a snapshot that does not reference b will not reference b itself.

In other words, if the path from every live image to the root of the snapshot tree includes a write to logical address a, then the physical block b is no longer needed and can be recycled. As demonstrate herein, this predicate can be expressed in terms of union and intersection operations over the set of logical addresses written to each node in the snapshot tree, providing a convenient framework for calculating block ownership.

Embodiments provide a more formal treatment of ownership accounting using logical address analysis. Given a snapshot tree T with k nodes, let L(T) give the tree's leaf nodes: T={$n_0$, $n_1$, . . . , $n_{k-1}$} L(T)={n|n∈T, n has no children}

Let $W_{n_i}$ give the set of all logical addresses written to node $n_i$, and let $R(n_i)$ give the set of all nodes along the path from $n_i$ to the root of the tree. An address a is reachable from $n_i$ if it has been written to any node in $R(n_i)$, and one can designate the set of all such addresses $R_{ni}$:

$$\mathcal{R}_{n_i} = \bigcup_{n \in R(n_i)} W_n$$

Let P ($n_i$, $n_j$) give the set of all nodes along the path from $n_i$ to $n_j$, excluding common ancestors:

$$P(n_i,n_j)=R(n_i) \oplus R(n_j)$$

The set of addresses written to nodes in P($n_i$,$n_j$) may be called divergent writes, because they break any potential sharing between the two nodes; this set is given by D<$n_i$,$n_j$>:

$$\mathcal{D}_{\langle n_i,n_j \rangle} = \bigcup_{n \in P(n_i,n_j)} W_n$$

For a leaf node $n_i$, one can designate as $D_{n_i}$ the set of addresses that have diverged in every other lead node:

$$\mathcal{D}^*_{n_i} = \bigcap_{n_j \in L(T), n_j \neq n_i} \mathcal{D}_{\langle n_i,n_j \rangle}$$

Finally, that address a is denoted as exclusive to a leaf node $n_i$ if it is reachable from $n_i$ and it has diverged in every other leaf node; the set of all such addresses is given by $E_{ni}$:

$$\varepsilon_{n_i} = R_{n_i} \cap D_{n_i}^*$$

$E_{n_i}$ represents the storage cost of $n_i$ in the sense that if $n_i$ were to be deleted, only blocks corresponding to these addresses could be reclaimed.

Algorithm 1 demonstrates how $E_{n_i}$ is calculated. First, the set of all addresses reachable from $n_i$ is computed by taking the union of writes to nodes from $n_i$ to the root. Then the set of divergent writes is computed for each other leaf node in the tree. Finally, the intersection over all divergent write sets and all reachable addresses is computed, giving $E_{n_i}$. Because paths are always traversed in order from $n_i$ to the root or other leaf nodes, redundant union operations can be avoided via simple memoization.

Assuming at least strictly binary trees (because internal nodes of degree one can be trivially coalesced), the time complexity of this algorithm for a tree with N nodes is $O(N^2)$: $O(N)$ divergent sets must be computed and the maximum path length between leaves is $O(N)$. The size of $W_n$ scales with the virtual capacity of the base image, giving a space complexity of $O(N*M)$ for an image with a virtual address space of M.

| Algorithm 1 Ownership Accounting |
| --- |
| 1:   procedure EXCLUSIVE(T, $n_i$, ∈ L(T)) |
| 2:       p ← $n_i$ |
| 3:       for each node n in PATH($n_i$, root) do |
| 4:           table[n] ← $W_n$ ∪ $W_p$ |
| 5:           p ← n |
| 6:       end for |
| 7:       for each leaf node $n_j$ ∈ L(T), $n_i$ ≠ $n_j$ do |
| 8:           for each node n in PATH($n_i$, $n_j$) do |
| 9:               if n ∉ table then |
| 10:                  table[n] ← table[p] ∪ $W_n$ |
| 11:              end if |
| 12:              if n ∈ P($n_i$, $n_j$) then |
| 13:                  p ← n |
| 14:              end if |
| 15:          end for |
| 16:      end for |
| 17:      $\varepsilon_{n_i}$ ← table[root] |
| 18:      for each leaf node $n_j$ ∈ L(T), $n_i$ ≠ $n_j$ do |
| 19:          $\varepsilon_{n_i}$ ← $\varepsilon_{n_i}$ ∩ table[$n_j$] |
| 20:      end for |
| 21:      return $\varepsilon_{n_i}$ |
| 22:  end procedure |

The $O(N^2)$ cost of Algorithm 1 can be improved in a couple of common scenarios. First, when computing the uniqueness of all nodes in a tree at the same time, redundant work can be avoided by caching all intermediate D<$n_j$,$n_i$> results for $n_i$, because D<$n_j$,$n_i$> will subsequently be needed to compute $E_{nj}$, and D<$n_j$,$n_i$>=D<nj,ni>.

Second, $E_{n_i}$ values can be updated incrementally as new write are applied to leaf nodes. For example, in a typical scenario where multiple periodic backups are retained for a single writable image, the divergent sets computed between immutable snapshot nodes can be cached and re-used; only divergent sets between snapshots and the writable image are invalidated by the new writes and must be re-computed.

With these techniques, the initial $O(N^2)$ cost of Algorithm 1 need only be incurred once when 'priming' the data structures for a given snapshot tree T, and this cost can be further amortized over time as subsequent queries are serviced.

In some embodiments, ownership sketches are used to encapsulate the data structures and logic needed to efficiently implement ownership accounting for a given snapshot. A sketch may comprise of information relating to unique address information regarding unique blocks (or in some cases, direct references to unique blocks) for writes made to a snapshot. In some embodiments, a sketch may be a compact or reduced data structure used for estimating properties of a much larger data set, such as all the addresses of all the unique blocks for a snapshot and/or a set of snapshots. For example, the kmv and hll data structures can be used to build sketches; a sketch may also comprise a composite of many probabilistic counter sketches (e.g., kmvs).

Embodiments may use sketches to associate counters with each image or snapshot in a tree. These counters are used to record the set of logical addresses that have been written to each image in the sketch.

TABLE 1

Ownership Sketch API

| Method | Description |
|---|---|
| create(name) → sketch | create a new sketch for a base image with the given name |
| get(sketch, name) → image | return a reference to the given image |
| clone(sketch, image, name) → image | create and returen a close of the given image |
| delete(sketch, image) | remove an image (or clone) from the sketch |
| update(sketch, image, block) | record a write to the image at the given block |
| exclusive(sketch, image) → cardinality | return an estimate of the image's unique blocks |
| pack(sketch) → byte array | serialize a sketch |
| unpack(byte array) → sketch | deserialize a sketch |

Table 1 presents the interface provided by ownership sketches. The interface is designed to make it easy to retrofit ownership sketches into existing storage systems simply by inserting a trace point somewhere along the data path such that the sketches can be updated when images are modified.

An image is initially represented as a single flat address space with an empty counter. As writes are applied to the image, its counter is updated with the logical addresses of these writes. When an image is snapshotted, the original counter is 'frozen' (i.e., made immutable), and a new, empty counter is created for the new image and its snap-shot. When an image or snapshot is deleted, its counter is discarded, and its parent node is recursively removed from the tree if it has no remaining children.

At any point in time, the amount of data exclusive to a particular image can be estimated by invoking the exclusive routine, which implements Algorithm 1. In this way the overhead of recording writes is kept low (requiring just an update to an in-memory counter), while the cost of estimating $E_n$ is amortized by deferring more expensive computations until such time as estimates are needed.

Ownership sketches cache intermediate results when appropriate, making it trivial to apply incremental updates. When new writes or snapshot operations are applied to images in the sketch, any cached results affected by the changes are automatically invalidated. This is handy for use cases that involve frequent queries, such as for UIs presenting live usage statistics to end users.

Sketches support pickling, allowing them to be lazily flushed to disk in simple flat files. Lazy flushing means that some updates may be lost in the event of a crash, but this is not a grave concern because ownership sketches are decoupled from critical system metadata like bitmaps and reference counts, which have much more demanding consistency requirements.

Algorithm 1 produces the complete set of logical addresses that are exclusive to a single snapshot. By resolving these addresses to physical blocks, the actual storage locations can be identified. However, in many embodiments it may not be critical or necessary to determine exactly which blocks are exclusive to a given image, but rather determining roughly how many are may be important. In other words, it will often suffice to know the size or cardinality of $W_n$ rather than knowing its constituent elements.

A practical ownership sketch implementation thus requires efficient counters capable of calculating both individual cardinalities and cardinalities of set expressions over multiple counters. Three different counting techniques are described hereinbelow, as well as an illustrative discussion regarding some of the trade-offs involved in choosing one over the other.

A naive counter implementation could simply use flat bitmaps to record which logical blocks have been written to a particular image. This approach is nice because it is simple and in many cases, it could leverage existing metadata maintained by underlying storage implementations.

However, flat bitmaps, while common, are not the most efficient data structure available for perfect counters, and they can incur significant overhead. For example, given a 100 GiB image with 32 snapshots, ownership metadata must be maintained for 65 nodes. Assuming images are stored as VHDs, embodiments may use the sector-granularity bitmaps (i.e., one bit per 512 bytes of data) maintained internally by this file format. Doing so, however, could require reading as much as 1.5 GiB of bitmaps from disks in order to determine how much data is exclusive to a single snapshot, which is clearly not appealing.

In embodiments hereof, there is alternatively implemented roaring bitmaps, an efficient, sparse, compressed bitmap format commonly used to implement bitmap indexes for data bases. This data structure is particularly well-suited for ownership accounting because it provides efficient union and intersection implementations thanks to its ability to support random access, and it commonly achieves significant space savings over naive bitmap representations.

For write-heavy workloads or large snapshot trees, the overhead required to maintain perfect counters may become excessively onerous. In these situations, embodiments can provide approximate ownership accounting by leveraging special probabilistic data structures. This approach draws from a large body of existing research in streaming algorithms that investigates how to estimate the cardinality of large data sets with very low memory overheads.

In general, streaming algorithms are so named because they are designed to process very large data sets in a single pass, typically with the constraint that time and space overheads must be very small (e.g., sublinear) with respect to the size of the input data set. The problem of counting distinct elements is well-studied within this paradigm. The severe memory constraints in this domain typically lead to probabilistic estimates.

Many estimation techniques involve constructing sketches or synopses, compact representations of data streams from which accurate cardinality estimates can be computed. Sketches are updated as elements of the data stream are processed, and at any point in time, speciallydesigned estimators can be applied to the sketches to calculate approximate cardinalities.

A wide variety of sketches have been studied, with HyperLogLog (HLL) representing the current state of the art. Exemplary embodiments below consider a K Minimum Values (KMV) sketch. The basic idea behind this sketch is to use a quality hash function to map elements of the input stream to a uniform random distribution with a fixed domain. Intuitively, the probability of observing a very small value in the sequence of hashed values increases with the number of unique elements encountered. In fact, a cardinality estimate can be derived from only the smallest observed value, although the variance of such an estimator would be quite large due to the likelihood of outliers.

In practice, KMV provides more accurate estimates by maintaining, as its name suggests, the k smallest hashed values. Assuming these values are drawn from a uniform random distribution, an estimate of the cardinality of the input stream can be derived from the average distance between them. An unbiased estimator for this sketch is given by (k−1)/max(K M V), where max(KMV) gives the largest hash value recorded in the sketch.

The KMV sketch is known as an ($\epsilon$, $\delta$)-approximation, meaning that $Pr[|D'-D|<=(1-\epsilon)*D]>=1-\delta$, where D and D' give the actual and estimated cardinalities, respectively. Given a sufficiently large input stream, increasing k provides increasingly accurate estimates, at the cost of additional storage and processing overhead. For example, for $\delta=0.05$ and k=1024, the theoretical upper bound of $\epsilon$ is roughly 0.06127 as the size of the input stream approaches infinity, and was observed to be around 0.06124 for a real data set of one million elements.

Figure 8:
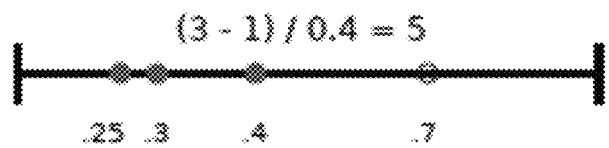
FIG. 8 shows an exemplary cardinality sketch showing hashed values in accordance with embodiments hereof.

Referring to FIG. 8, there is shown KVM sketches record the k the smallest hashed values of a data set (shown in solid circles) to estimate the cardinality of the entire multiset (including the outlined dots).

Figure 9:
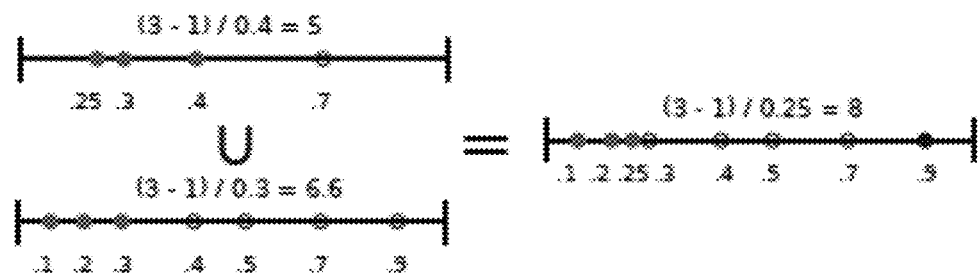
FIG. 9 shows another exemplary cardinality sketch showing hashed values in accordance with embodiments hereof.

Referring to FIG. 9, there is shown a union operation as applied to KVM sketches by taking the k smallest values from the merged sketches. The resulting sketch is identical to one which would have been created by counting the union of the two input data sets.

Figure 10:
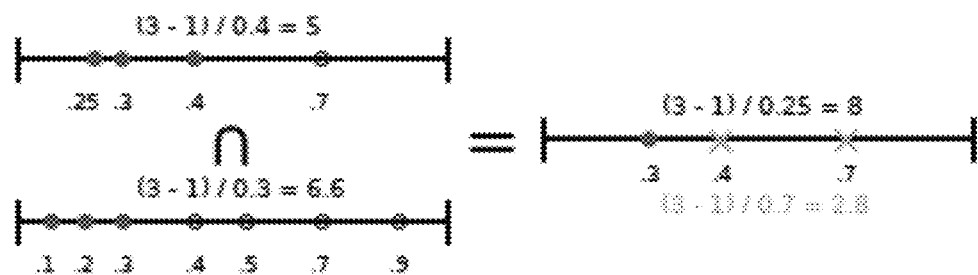
FIG. 10 shows an exemplary cardinality sketch showing hashed values in accordance with embodiments hereof.

Referring to FIG. 10, there is shown an intersection operation as applied to KVM sketches by taking all values present in both sketches. The error bounds of this technique are proportional to the cardinality of the larger set. In this example, the second set has observed more values, leading it to "forget" values (shown as orange crosses) that would have been recorded by a sketch counting the intersection of the two input data sets.

An appealing property of KMV sketches is that multiple sketches over separate data streams can be combined to produce an estimate of the cardinality of the union of the original streams—in other words, an analogue of the set union operation can be applied directly to sketches themselves. This is valuable in scenarios where it is infeasible or impossible to maintain sketches for all combinations of data streams that might subsequently be of interest.

The set union operation is trivially applied to two KMV sketches by constructing a new sketch with the k smallest values present in either of the original sketches; it is easy to see that this is exactly the same sketch that would be produced by processing the union of the input data streams. Indeed, many common sketches, including HLLs, naturally lend themselves to union estimates in a similar manner.

Unfortunately, many sketches do not support set intersection operations in quite the same way. Conceptually, the set intersection operation can be applied to two KMV sketches by constructing a new sketch with the k smallest values present in both original sketches. However, this is clearly not the same sketch that would have been produced by processing the intersection of the original streams. Indeed, it is likely that two sketches combined in this way will produce a new sketch with fewer observations than the originals, leading to less accurate cardinality estimates.

Moreover, some of the more sophisticated sketches like HLLs are structured such that no obvious set intersection analogue has been identified for them at all. For these sketches, estimates based on the inclusion/exclusion principle have been proposed as an alternative to directly estimating intersection cardinalities. This approach is based on the fact that for two sets A and B, $|A \cap B|=|A \cup B|-|A|-|B|$. However, this proposal, as well as related techniques based on estimating Jaccard coefficients, produce estimates with errors proportional to the size of the union of the two sets. This is problematic when the cardinality of the intersection is much smaller than that of the union, as the error bounds may be larger than the estimates themselves.

This presents a challenge when attempting to use cardinality sketches for ownership accounting, because, as shown herein, computing $E_{n_i}$ involves computing the intersection of the divergent sets between $n_i$ and all other leaf nodes. Particularly in situations where $D^* << D_{n_i} < n_i, n_j >$, the estimates produced by this technique may have large relative error bounds. This is somewhat mitigated by the fact that the storage costs for snapshots in such situations are by definition relatively low, since $|E_{n_i}|$ will be small. Embodiments hereof utilize one of a variety of probabilistic approaches for estimating the cardinality of arbitrary set expressions. These approaches leverage more statistically efficient estimators and generally provide more accurate results. Described below are three probabilistic counters based on these techniques, but embodiments are not limited to these specific counters.

The low, fixed cost of probabilistic counters suggests a third, hybrid counting strategy wherein perfect counters are augmented with probabilistic counters. In this scheme, both types of counters are maintained for every image in an ownership sketch. For images which see only small numbers of writes, the perfect counters can be used to provide exact ownership accounting. However, if the storage costs of maintaining perfect counters becomes too burdensome, the sketch can convert to using probabilistic counters (with fixed storage overheads) to provide approximate ownership accounting.

Embodiments implement the interface presented in Table 1 as a generic Python library that manipulates an abstract counter interface. Embodiments support different counter implementations which allows users to trade accuracy for overhead according to their needs. The library implements Algorithm 1 by constructing set-algebraic expressions in conjunctive normal form. Expressions are simplified as much as possible using symbolic analysis before being passed to counter implementations.

Counter implementations expose a simple interface for counting values and computing cardinality estimates of both individual counters and compound expressions over multiple counters. They may also optionally provide an interface for constructing new counters corresponding to compound expressions. The sketch library uses these constructed counters to reduce the cost of incremental updates when possible. For example, counters constructed from the divergent sets of all read-only snapshot pairs are cached by the sketch library and substituted for equivalent compound expressions in subsequent computations, thereby avoiding redundant union operations.

Embodiments may use any of the following non-limiting examples of probabilistic counters for use in connection with ownership sketches.

Roaring:

The internal structure of roaring bitmaps is such that they can only represent 32-bit values. Some embodiments support 64-bit disk addresses (or 52-bit block addresses, assuming 4 KiB blocks) by combining multiple bitmaps in a hash table keyed by the most significant 32 bits of the ad-dress space. Updating a roaring counter involves first locating the correct bitmap in the hash table, and then up-dating the bitmap itself. Union and intersection operations are performed by iterating hash tables in sorted order and comparing corresponding bitmaps in a piece-wise manner.

Kmv:

Embodiments determining probabilistic sketch using k-minimum values cardinality counters augment with improved union and intersection operators. Some implementations maintain the k values in a balanced tree. Updating the sketch involves hashing the original value to generate a uniform random 32-bit word that is inserted into the tree only if it is smaller than the largest stored value. The union operation involves constructing a new balanced tree using the k smallest values found in both original trees, and the intersection operation requires constructing a new tree composed of the intersection of the values from both original trees.

Skmv:

another probabilistic sketch uses streaming kmv sketches. These sketches extend the original kmv sketch with a running cardinality estimate; their update procedure is similar to that of the kmv sketch, except that the running estimate is updated when new k-minimum values are inserted into the sketch. Union and intersection operations involve first applying these operations to the underlying kmv sketches, and then estimating a final cardinality by combining weighted estimates from each component sketch with the estimate produced by the final combined sketch. Unlike kmv sketches, skmv sketches do not support closed union and intersection operations, because the running estimates of the individual sketches cannot meaningfully by combined to produce a new tally for the for the resulting sketch.

Union:

Another probabilistic sketch uses a continuous variant of Flajolet Martin (FM) sketches combined with the proportional union technique for estimating the cardinality of set operations. The union sketch uses stochastic averaging to update a fixed-size array of 32-bit words. Updating the sketch involves hashing the original value twice with two independent hash functions; the first hashed value is used as an index into the array of words, and the second value is inserted at the designated index if it is smaller than the existing value stored there. The union operation, which is closed for this sketch, involves constructing a new array where each element is the minimum of the corresponding elements in the original arrays. Estimating the cardinality of union and intersection expressions additionally requires parameter estimation based on a simple calculation inspired by the maximum likelihood estimation technique.

In an example embodiment, two high-level properties of ownership sketches are disclosed. First, the cost of maintaining and querying four different sketch variants is measured, which demonstrates that embodiments hereof meet the performance requirements of modern storage systems. Second, the accuracy of probabilistic sketches as applied to real-world storage traces is shown, and a parametric analysis of the primary contributor to estimation error using a synthetic workload generator is presented.

Unless otherwise noted, all probabilistic sketches measured in the following experiments are configured to use 256 KiB of memory (roaring sketches are unbounded in size and grow proportionally to the number of unique values encountered).

Figure 4:
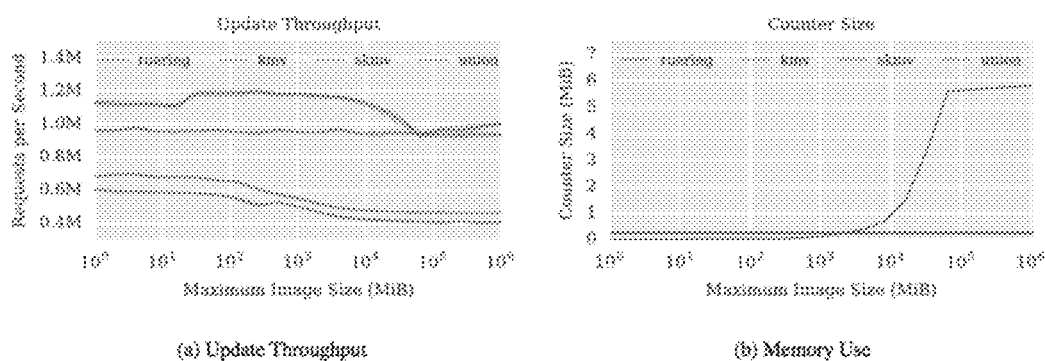
FIG. 4 shows the throughput and memory use of four sketch variants in accordance with embodiments hereof.

FIG. 4 shows the throughput and memory use of four sketch variants. In both experiments, the time required to update a sketch with one million values drawn from a uniform random distribution is shown. The sample space is varied across trials in order to generate value sequences with different ranges and cardinalities. Performance and memory consumption of four different sketch implementations is shown in FIG. 4. For each observation, the time and space required to update a sketch with a sequence of one million values is recorded, drawn from a uniform random distribution with the sample space restricted to the maximum image size. The average of ten observations per image size is shown in FIG. 4, with bands giving 98% confidence intervals.

As FIG. 4a shows, every sketch variant is capable of processing hundreds of thousands of updates per second. The union sketch exhibits a constant throughput across the spectrum of value ranges because the cost of updating this sketch is O(1). The kmv and skmv sketches show a roughly thirty percent decrease in throughput as the input range grows from 25 K to 2.5 M because an increasing number of new k-minimum values are encountered within these ranges, leading to more frequent and costly tree updates until a steady state is reached. The skmv sketch shows an additional overhead due to the calculations involved in maintaining its running estimate. Finally, the roaring sketch shows very good throughput across the input ranges, with a dip where the range spills over what can be accounted for with a single bitmap.

FIG. 4b shows how the size of roaring sketches scales both with cardinality and input range. A pronounced increase in memory overhead can be seen once the range of input values exceeds 4 M, as multiple sparse bitmaps must be allocated to track values larger than $2^{32}$. The overhead levels off because the number of updates is restricted to one million; recording more updates at larger input ranges would require additional memory. FIG. 4b also illustrates the benefit of the probabilistic sketches, which, as expected, require a constant amount of memory regardless of input range and cardinality.

Figure 5:
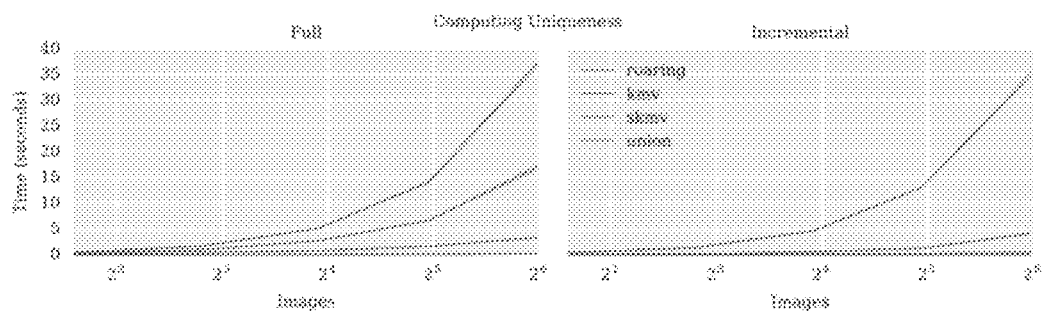
FIG. 5 shows uniqueness queries against trees of varying sizes in accordance with embodiments hereof.

FIG. 5 shows the time required to compute the number of blocks unique to a given image in a snapshot tree as a function of the size of the tree. For each observation, a snapshot tree is shown with the given number of nodes and record 256 K writes to each node, with write values drawn from a uniform random distribution. Measured is the time required to perform a full uniqueness query that computes the number of blocks unique to a given leaf node. The asymptotic complexity of this computation is $O(N^2)$ for a tree with N leaves, but as the figure shows, the efficiency of sketch set operations has a big impact on overall computation time.

In particular, the roaring sketch may benefit from an optimized C implementation that provides a very fast union implementation. The kmv sketch, whose union operator (implemented in pure Python in some embodiments) involves manipulating balanced trees, shows significantly more overhead than the union sketch, whose union operator only needs to iterate over flat arrays. Finally, the skmv sketch shows the highest overhead because it does not support a closed union operation, so intermediate results cannot be memoized.

Measured is the time required to perform an incremental uniqueness query. Embodiments first issue a full query for leaf node $n_i$, then applying writes to a leaf node $n_j$, and finally issuing a second query for $n_i$. Incremental queries against sketches that support a closed union operator can be partially satisfied by cached sketches for paths not affected by new updates. This is particularly useful in common scenarios where only one or a few "live" images in a snapshot tree are actively updated at any given time. This optimization significantly reduces query time for both the kmv and union sketches, but not the skmv sketch (again because it does not support a closed union operator).

In embodiments, probabilistic sketches are used that provide accurate estimates of the cardinality of union operations but may not do as well when estimating the cardinality of intersection operations, especially when the cardinalities of the individual sketches differ significantly.

In embodiments, approximate ownership sketches provide accurate estimates when all images in a tree have absorbed roughly the same number of unique writes. This is further shown for workloads with regular write patterns that are snapshotted at regular intervals.

Figure 6:
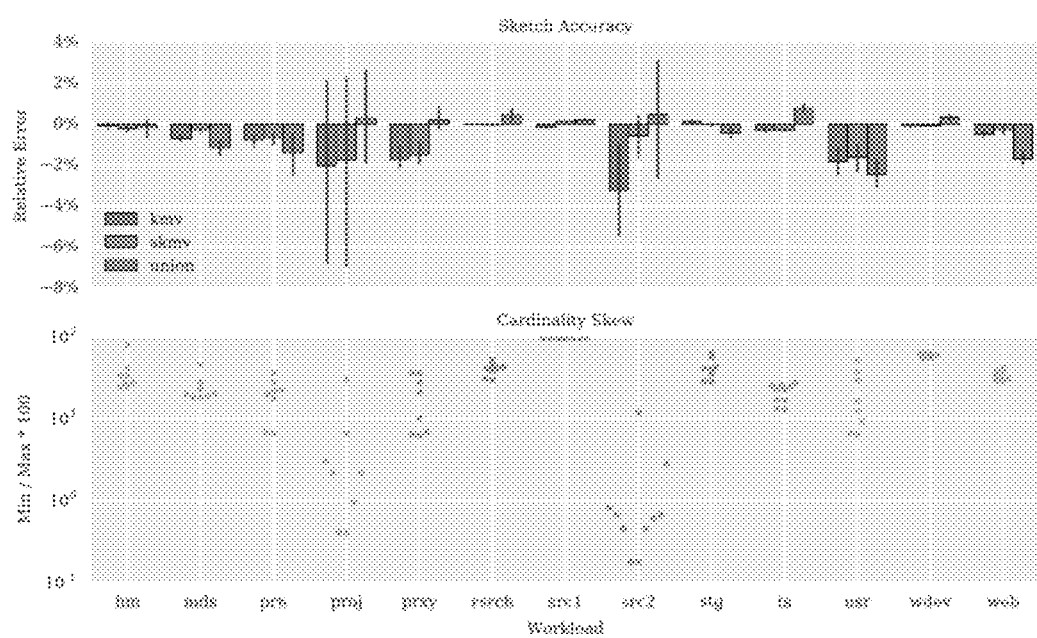
FIG. 6 shows sketch accuracy and Jaccard Coefficients for exemplary workloads in accordance with embodiments hereof.

FIG. 6 presents the accuracy of estimates for a collection of real-world storage traces. The traces record a week's worth of block-level storage requests for a variety of servers, including revision control servers, a filer, and a web server. A number of exemplary traces are shown with a simulated daily snapshot schedule against each of the disclosed or other probabilistic sketches. The number of blocks that are unique to each image at the end of the trace is calculated, and the average is computed (and 98% confidence intervals) of the error of these estimations relative to the corresponding ground truth values.

As the top half of FIG. 6 shows, the probabilistic estimates are quite accurate for these workloads, with relative errors generally falling within ±4% of the actual values. In general, the skmv and union sketches achieve better accuracy than the basic kmv sketch, although no single sketch outperforms all others for all traces.

The bottom half of FIG. 6 presents a rough measure of the expected error for these workloads. The cardinality skew for a leaf image $n_i$ of a sketch T is the ratio of the lowest- and highest-cardinality paths from $n_i$ to the root and all other leaves. In other words, it gives the ratio of the lowest- and highest-cardinality paths used to compute $E_{n_i}$ and thus gives a rough idea of the expected error of the estimated intersection operation. FIG. 6 plots these values for each snapshot of each workload. The correlation between cardinality skew and sketch accuracy is evident. In particular, the workloads proj and src2, which exhibit the largest relative errors, also exhibit the largest cardinality skews; both workloads have multiple snapshots with very few unique blocks relative to the other snapshots in their sketches, leading to higher relative errors.

In some cases, determining the formula requires combining many very large data sets determining this formula for even one snapshot as well as for all or a subset of all snapshots, can be prohibitive. This problem can be further exacerbated with a very high number of snapshots and so in some embodiments, a probabilistic determination of unique elements of any given snapshot can be implemented. The acceptable confidence of estimation for the probabilistic estimation can therefore be tuned in some embodiments by a user depending on the level of certainty needed to determine whether snapshots can be deleted.

In other embodiments, a garbage collection process can be implemented relating to higher level blocks and references to data blocks contained therein. Depending on the number of unique blocks in snapshots above a given child snapshot, certain snapshots can be prioritized for deletion notwithstanding a relative similarity or difference in the number of unique blocks.

In some embodiments, there is provide a method for determining the number of unique blocks that were created in a given number of snapshots in a given time interval, including for example the most recent snapshot.

In some embodiments, there may be provided an API for implementing the snapshot assessment tool.

In some embodiments, the data storage system may comprise one or more hardware units each comprising 4 dual core Intel™ Xeon™ processors as the computer processing component; 4 Intel™ 910 PCIe flash cards and twelve 3 Tb mechanical disks as the data storage components; and 4 lgbe Network Interface Cards and one or two 10 gbe openflow-enabled switches, as the communications interface. The hardware unit is enclosed in a single 2u supermicro enclosure; in some embodiments the data storage facility comprises one or more hardware units which may present aggregated, scalable, data storage, often as virtual data storage resources. In general, a computing device comprising a CPU, RAM (e.g. 64 mb), and data storage (e.g. disk, SSD, etc.) may be used to carry out some of the embodiments discussed herein. A workload may include the processes that constitute the processing of a virtualized machine or workload thereof (i.e. a workload may be one or more VMs running on the data storage system). In some embodiments, a network switch is configured to interface the hardware units so that all communication will access the system thereby and perform load balancing and distribution functions. This allows some systems to be exposed behind a single address or location.

What is claimed is:

1. A method of determining snapshot storage space consumption in a data storage system, the data storage system comprising one or more storage resources for storing data and a snapshot being a representation of a given state of a data object comprising of direct references to data blocks for data that has been changed from a prior state and indirect references to existing direct references in the prior state for unchanged data, the method comprising:
    selecting for a given data object stored in the data storage system, a first snapshot of said data object;
    identifying at least some prior snapshots from which the first snapshot was directly or indirectly created;
    determining a count of unique direct references from all of the first and prior snapshots; and
    storing the count of unique direct references in association with the first snapshot;
    wherein the first snapshot and the prior snapshots are selected as candidates for deletion if the count of unique direct references is higher than a threshold.

2. A method of determining snapshot storage space consumption in a data storage system, the data storage system comprising one or more storage resources for storing data and a snapshot being a representation of a given state of a data object comprising of direct references to data blocks for data that has been changed from a prior state and indirect references to existing direct references in the prior state for unchanged data, the method comprising:

for each write of data to a given snapshot of the data object, storing unique address information relating to the unique direct references for said writes, said unique address information comprising at least a count of unique direct references;

upon generating a further snapshot of a prior snapshot, retaining said prior snapshot and unique address information in storage as read-only access; and determining a count of unique direct references for all snapshots relating to the data object based on the stored unique address information;

wherein the first snapshot and the prior snapshots are selected as candidates for deletion if the count of unique direct references is higher than a threshold.

3. The method of claim 2, wherein the unique address information comprises an address identifier for each unique direct reference for each snapshot, and the step of determining comprises counting said address identifiers.

4. The method of claim 2, wherein the step of determining comprises a probabilistic counting of the unique address information for a subset of the snapshots, and wherein said count of unique references is an estimate.

5. The method of claim 4, wherein the probabilistic counting includes using a hash function to map elements of the unique address information to a uniform distribution.

6. The method of 5, wherein the probabilistic counting is one of HyperLogLog, K minimum values (kmv), streaming kmv, and proportional union.

7. A data storage system with snapshot storage space consumption management, said data storage system comprising:

one or more storage resources for storing data and snapshots thereof, each snapshot being a representation of a given state of a data object comprising of direct references to data blocks for data that has been changed from a prior state and indirect references to existing direct references in the prior state for unchanged data, a processing component configured to:

store unique address information relating to the unique direct references for said writes, said unique address information comprising at least a count of unique direct references and to retain said prior snapshot and unique address information in storage as read-only access upon the creation of new snapshots; and determine a count of unique direct references for all snapshots relating to the data object based on the stored unique address information;

wherein the first snapshot and the prior snapshots are selected as candidates for deletion if the count of unique direct references is higher than a threshold.

8. The system of claim 7, wherein the unique address information comprises an address identifier for each unique direct reference for each snapshot, and the step of determining comprises counting said address identifiers.

9. The system of claim 7, wherein the step of determining comprises a probabilistic counting of the unique address information for a subset of the snapshots, and wherein said count of unique references is an estimate.

10. The system of claim 9, wherein the probabilistic counting includes using a hash function to map elements of the unique address information to a uniform distribution.

11. The system of claim 10, wherein the probabilistic counting is one of HyperLogLog, K minimum values (kmv), streaming kmv, and proportional union.

* * * * *